(12) United States Patent  
Lerma et al.

(10) Patent No.: US 8,830,009 B2  
(45) Date of Patent: Sep. 9, 2014

(54) POWER SUPPLY CABLE FOR POWER LINE COMMUNICATION EQUIPMENT

(71) Applicant: Marvell Hispania, S.L.U., Madrid (ES)

(72) Inventors: Antonio Poveda Lerma, Valencia (ES); Miguel Gargolla Parra, Almacera (ES); Jorge Blasco Claret, Valencia (ES)

(73) Assignee: Marvell Hispania, S. L. U., Madrid (ES)

( * ) Notice: Subject to any disclaimer, the term of this patent is extended or adjusted under 35 U.S.C. 154(b) by 22 days.

(21) Appl. No.: 13/764,436

(22) Filed: Feb. 11, 2013

(65) Prior Publication Data

US 2013/0147572 A1   Jun. 13, 2013

Related U.S. Application Data

(63) Continuation of application No. 13/465,979, filed on May 7, 2012, now Pat. No. 8,373,517, which is a continuation of application No. 12/513,720, filed as application No. PCT/ES2007/000251 on Apr. 26, 2007, now Pat. No. 8,174,335.

(30) Foreign Application Priority Data

Nov. 6, 2006   (ES) .................................. 200602807

(51) Int. Cl.
 *H04B 3/56* (2006.01)
 *H01P 1/00* (2006.01)

(52) U.S. Cl.
 USPC ............................................ 333/12; 333/260

(58) Field of Classification Search
 USPC .............................. 333/12, 20, 24 R, 181, 260
 See application file for complete search history.

(56) References Cited

U.S. PATENT DOCUMENTS

| 5,346,410 A | 9/1994 | Moore, Jr. |
| 5,461,351 A | 10/1995 | Shusterman |
| 5,650,908 A | 7/1997 | Stanton |

(Continued)

FOREIGN PATENT DOCUMENTS

| FR | 2 750 256 A1 | 12/1997 |
| JP | 2006-351860 A | 12/2006 |
| JP | 2007-129687 A | 5/2007 |

OTHER PUBLICATIONS

Office Action mailed Nov. 8, 2011, in corresponding Japanese Patent; Application No. 2007-098110, and its English translation; 4 pages.

(Continued)

*Primary Examiner* — Dean O Takaoka

(57) ABSTRACT

A method including receiving power, from a power line, at a device configured to communicate via the power line. The power from the power line is received at the device via a power cord of the device being connected, via a connector, to a power outlet from which the power of the power line is supplied. The connector is coupled to a first end of the power cord. The device is coupled to a second end of the power cord. The method further includes supplying a signal generated by the device to a choke located on the power cord. The choke is located closer to the first end of the power cord than to the second end of the power cord. The method further includes transmitting the signal from the choke to the power line for communication via the power line.

12 Claims, 2 Drawing Sheets

(56) References Cited

U.S. PATENT DOCUMENTS

| | | | |
|---|---|---|---|
| 6,150,896 A | 11/2000 | DeCramer et al. | |
| 6,329,906 B1 | 12/2001 | Fisher et al. | |
| 6,507,260 B1 | 1/2003 | Baumann et al. | |
| 8,174,335 B2 | 5/2012 | Poveda Lerma et al. | |
| 8,373,517 B2 * | 2/2013 | Poveda Lerma et al. | 333/12 |
| 2002/0110310 A1 | 8/2002 | Kline | |
| 2003/0160684 A1 | 8/2003 | Cern | |
| 2004/0227622 A1 | 11/2004 | Giannini et al. | |

OTHER PUBLICATIONS

International Search Report issued Sep. 5, 2007 in the International (PCT) Application of which the present application is the U.S. National Stage.

* cited by examiner

POWER SUPPLY CABLE FOR POWER LINE COMMUNICATION EQUIPMENT

CROSS-REFERENCE TO RELATED APPLICATIONS

This is a continuation of U.S. patent application Ser. No. 13/465,979, filed on May 7, 2012, which is a continuation of U.S. patent application Ser. No. 12/513,720 (now U.S. Pat. No. 8,174,335), filed on Oct. 27, 2009, which is a national stage application of PCT Application No. PCT/ES07/00251, filed on Apr. 26, 2007, which claims the benefit of Spanish Application No. P200602807, filed on Nov. 6, 2006. The entire disclosures of the above applications are incorporated herein by reference.

BACKGROUND

As stated in the title of this descriptive specification, the present invention relates to a process for reduction of the common mode current for power line communications equipment, which has the object of reducing the level of common mode signal in order to satisfy the standards of different countries on power line communications equipment, all of which without having to reduce the injected power, which would worsen the coverage and the efficiency of the communications system.

In general, the invention is applicable to any electric circuit in which the common mode current needs to be reduced and more particularly in electric circuits used in telecommunications equipment which use the mains network as transmission medium.

Defined below are some terms which are used in this document. Let a signal source be formed from an electric generator, a circuit via which the generated current flows and an additional circuit suitable for passing current coming from the generator and connected to the circuit in some way. Common mode current is defined as being that current which flows through the conductor and returns via the circuit or the source.

Moreover, common mode choke is described as being that device capable of attenuating or reducing the level of the common mode current in an electric circuit. Power line communications equipment is likewise defined as the type of communication by means of electrical defined as the type of communication by means of electrical signals that use the low, medium or high tension electrical mains network as communications channel.

Power line communications equipment is likewise defined as the type of communication by means of electrical defined as the type of communication by means of electrical signals that use the low, medium or high tension electrical mains network as communications channel.

In the majority of electrical systems, common mode currents need to be attenuated due to their actual functioning, with the aim of reducing the electromagnetic interference with other devices.

The state of the art already contains devices for reducing common mode currents, as an example of which one can cite switched power supply sources which use common mode filters for reducing their conducted and radiated electromagnetic emissions [which can be found in many different documents such as AN 15 on POWER INTEGRATIONS]. Another example is communications by means of Ethernet cable, fitted with common mode chokes for reducing their conducted and radiated emission levels in the corresponding frequency band.

There currently do not exist devices for reducing in any effective way common mode levels in power line communications systems, and the devices existing and used in other applications are of no use for this type of communications on account of their limitations regarding working voltages and attenuations in differential mode. Moreover, in order for the reduction in common mode current to be effective, both the way in which the common mode, choke is constructed and its location in the communications circuit are of overriding importance.

SUMMARY

In order to achieve the objectives and avoid the drawbacks stated in the above sections, the invention consists of a process for reduction of the common mode current for power line communications equipment, where the mains network is used as the communications medium, and which at least comprises applying the signal transmitted by the communications equipment via a common mode choke circuit; characterized in that the signal (transmitted by the communications equipment via a common mode choke circuit) is applied on braided signal cables belonging to the common mode choke circuit mounted around a toroidal magnetic core. In this manner, the differential mode inductance is minimized.

The common mode choke can be located internally or externally to the communications equipment. If it is internal, its position will be as an output element from the power line communications equipment. If it is external, its position will be between the communications equipment and the injection point into the mains network. One particular case is to locate the special common mode choke at the injection point of the communications signal to the mains network, which has the added advantage of increasing the impedance of the common mode loop.

One particular case is to locate the special common mode choke at the injection point of the communications signal to the mains network, which has the added advantage of increasing the impedance of the common mode loop.

Below, in order to facilitate a better understanding of this specification and forming an integral part thereof, some figures are attached in which, on an illustrative rather than limiting basis, the object of the invention has been represented.

DESCRIPTION

Figure 1:
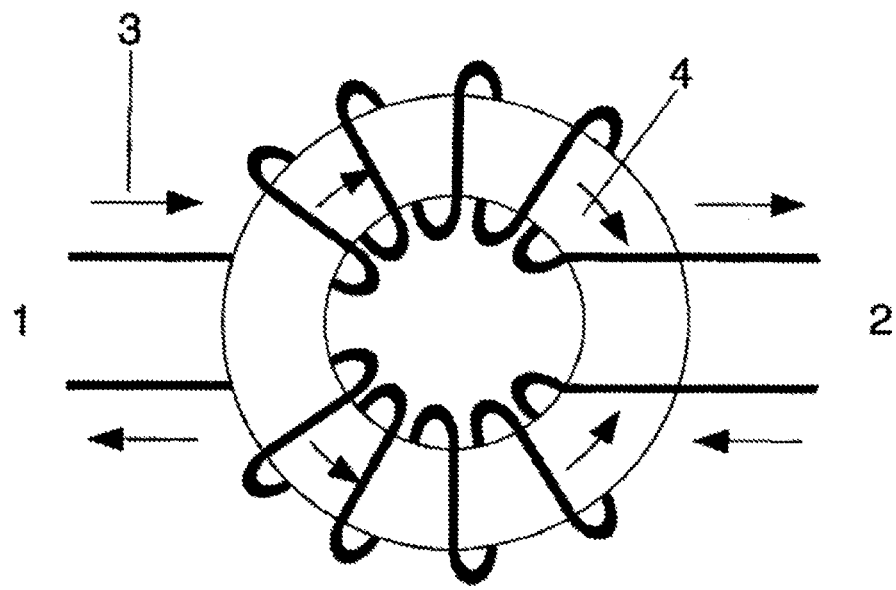
FIG. 1 represents a type of choke circuit of those known conventionally, which presents impedance in common and differential mode.

A description is made forthwith of an example of the invention, making reference to the numbering adopted in the figures.

In order to introduce PLC (power line communications) products in the market, it is necessary to satisfy the regulations concerning electromagnetic emissions on PLC devices. One of the most important requirements is the limit of common mode current which, on a standard basis, is measured with a device known as a T-shaped Impedance Stabilization Network, or T-ISN, in a controlled environment. With this measurement, the common mode is obtained coming from the Device Under Test (DUT). In this measurement, part of the differential signals coming from the DUT are converted into common mode signals, owing to the longitudinal conversion loss or LCL.

Power line communications equipment usually has a switched mode power supply or SMPS source connected to the mains network at the same point where the communications signal is injected. This SMPS represents an unbalanced load connected in parallel with the PLC signal source, with which, when starting to transmit, a certain amount of differential signal will, be converted into common mode, owing to parasite capacities, and the result of the measurement with the T-ISN will be a larger common mode than expected.

One solution to this problem is to reduce the power transmitted by the PLC equipment, but this entails various drawbacks, such as worse coverage and a lower transmission capacity (throughput).

Even in the case that the injected PLC signal were to be completely balanced (in other words, purely differential), measurement with T-ISN imposes a certain quantity of common mode current on the probe, which can only be reduced by decreasing the power of the signal. If the injected signal has a certain amount of common mode current, this will be measured additionally on top of that of the current probe, which makes it important to maintain the signal output from the PLC equipment as balanced as possible.

The objective of the present invention is to succeed in reducing the level of common mode signal in order to satisfy the regulations of different countries, in such a way that it is not necessary to make a sudden reduction in the injected power, which would worsen the coverage and the efficiency of the communications system.

The method employed for this consists of using a special common mode choke at the output from the PLC equipment which reduces common mode emissions as much as possible. This choke can be located both internally and externally to the communications equipment, depending on the type of equipment it is wished to develop.

In the state of the art, conventional common mode chokes are used to suppress electromagnetic interference (or EMI) in switched sources. These chokes are designed for achieving a powerful attenuation on the common mode signal without saturating its magnetic cores and, ideally, they can be represented as high impedance for common mode signals and a short-circuit for differential signals.

In FIG. 1 one can see one of these conventional chokes, where (1) represents the input, (2) the output, (3) the path of the current and (4) the direction of the field within the choke. Chokes of this kind are valid for the purpose for which they were created, namely, attenuating the noise in common mode coming from the power supply source and permitting the passage of 50 Hz currents without saturating the magnetic core, but they are not suitable for PLC technology on account of their impedance characteristics.

In the state of the art there exist two types of common mode (CM) chokes for EMI purposes. On the one hand there are toroidal CM chokes which perform well at high frequency, in other words, with high self-resonance frequency or SRF, but which present low impedance in common mode. On the other hand, there exist common mode chokes that are spool wound, which perform well at low frequencies, namely they have high impedance in low frequency common mode, but perform badly at high frequencies (due to having a low SRF). Both types of commercial chokes present impedance in common mode and in differential mode.

For PLC equipment the impedance has to be in common mode only, so neither toroidal CM chokes nor spool wound chokes can be used due to the presence of a residual inductance.

Figure 2:
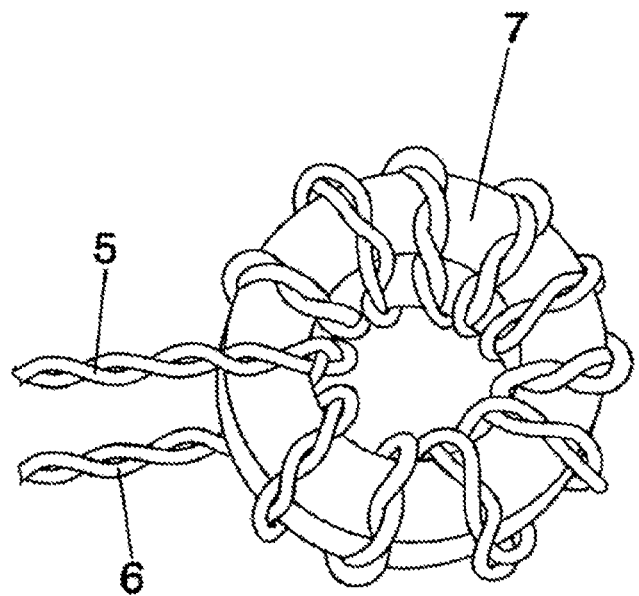
FIG. 2 shows the choke used by the invention for reducing the common mode signal.

In order to achieve the stated objective, the proposed method consists of injecting the signal through a special common mode choke consisting of braided signal cables mounted around a toroidal magnetic core, which minimizes the dispersion inductance. This special choke can be seen in FIG. 2, where (5) indicates the signal input (output of the PLC equipment), (6) the signal output (to the mains network) and (7) the magnetic torus.

Figure 3:
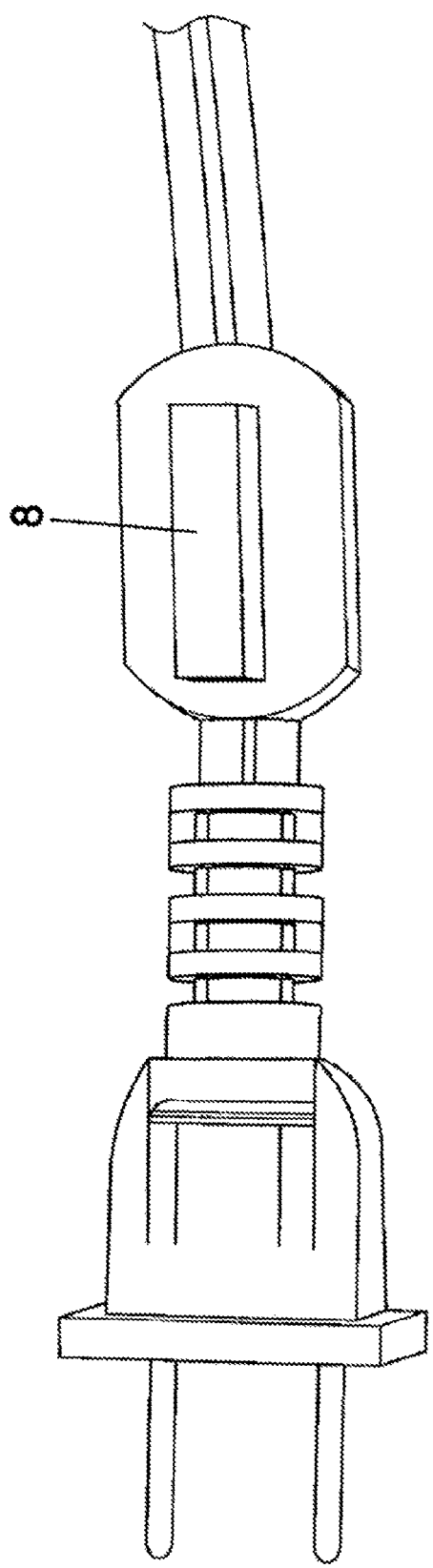
FIG. 3 shows an example of the location of the choke of the invention in the power supply cable for the power line communications device, in which the choke is located at the injection point of the signal to the mains.

In the majority of cases, in order to reduce common mode currents from the signal source, this special common mode choke needs to be included at the output from the PLC equipment. In the case of tabletop communications equipment the common mode signal can be reduced further by placing the choke between the PLC equipment and the injection point to the mains. The optimum location point for the special common mode choke is the injection point of the communications signal to the mains, which the special choke can achieve at the end of the power supply cable for the equipment which can be seen in FIG. 3 as (8).

What is claimed is:

1. A method comprising:
receiving power, from a power line, at a device configured to communicate via the power line, wherein the power from the power line is received at the device via a power cord of the device being connected, via a connector, to a power outlet from which the power of the power line is supplied, and wherein (i) the connector is coupled to a first end of the power cord, and (ii) the device is coupled to a second end of the power cord;
supplying a signal generated by the device to a choke located on the power cord, wherein the choke is located closer to the first end of the power cord than to the second end of the power cord; and
transmitting the signal from the choke to the power line for communication via the power line.

2. The method of claim 1, further comprising reducing a common-mode current associated with the signal transmitted via the power line to less than or equal to a predetermined threshold.

3. The method of claim 1, wherein transmitting the signal from the choke to the power line for communication via the power line comprises transmitting the signal via the power line at a power level greater than or equal to a predetermined threshold.

4. The method of claim 1, wherein transmitting the signal from the choke to the power line for communication via the power line comprises transmitting the signal via the power line at a power level that is inversely proportional to a common-mode current associated with the signal.

5. The method of claim 1, wherein the choke includes a braided cable wound around a magnetic core, and wherein:
supplying the signal generated by the device to the choke comprises supplying the signal to a first end of the braided cable; and
transmitting the signal from the choke to the power line for communication via the power line comprises transmitting the signal from a second end of the braided cable to the power line.

6. The method of claim 5, wherein:
the magnetic core is toroidal in shape, and
the cable is wound a plurality of times through a center of and around the magnetic core.

7. A system comprising:
a power supply configured to supply power from a power line to a device, wherein the device is configured to communicate via the power line, and wherein the power supply is configured to receive the power from the power line via a power cord of the device being connected, via a connector, to a power outlet from which the power of the power line is supplied, and wherein (i) the connector is coupled to a first end of the power cord, and (ii) the device is coupled to a second end of the power cord; and
a signal generator configured to (i) generate a signal to be communicated via the power line, and (ii) supply the signal to a choke located on the power cord, wherein the choke is located closer to the first end of the power cord than to the second end of the power cord,
wherein the signal is transmitted from the choke to the power line for communication via the power line.

8. The system of claim 7, wherein a common-mode current associated with the signal transmitted via the power line is less than or equal to a predetermined threshold.

9. The system of claim 7, wherein the signal is transmitted via the power line at a power level greater than or equal to a predetermined threshold.

10. The system of claim 7, wherein the signal is transmitted via the power line at a power level that is inversely proportional to a common-mode current associated with the signal.

11. The system of claim 7, further comprising the choke, wherein:
the choke includes a braided cable wound around a magnetic core,
the signal generator supplies the signal to a first end of the braided cable, and
the signal is transmitted from a second end of the braided cable to the power line.

12. The system of claim 11, wherein:
the magnetic core is toroidal in shape, and
the cable is wound a plurality of times through a center of and around the magnetic core.

\* \* \* \* \*